(12) United States Patent
Kihara

(10) Patent No.: US 6,912,062 B2
(45) Date of Patent: Jun. 28, 2005

(54) ELECTRONIC MAIL-FACSIMILE COMMUNICATION SYSTEM, METHOD AND RECORDING MEDIUM

(75) Inventor: Toshiaki Kihara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 09/798,328

(22) Filed: Mar. 2, 2001

(65) Prior Publication Data

US 2001/0033391 A1 Oct. 25, 2001

(30) Foreign Application Priority Data

Apr. 21, 2000 (JP) ........................................ 2000-121267

(51) Int. Cl.$^7$ .......................... H04N 1/00; H04M 11/00
(52) U.S. Cl. ...................... 358/1.15; 358/407; 358/402; 379/100.09; 379/100.08; 379/93.24; 379/100.01
(58) Field of Search ............................... 358/1.15, 1.16, 358/407, 402, 400, 405, 440, 468; 379/100.01, 93.01, 100.08, 100.09, 100.13, 93.15; 382/112; 370/490; 709/246

(56) References Cited

U.S. PATENT DOCUMENTS 6,424,426 B1 * 7/2002 Henry ........................ 358/1.15
6,559,966 B1 * 5/2003 Laverty et al. ............ 358/1.15
6,625,646 B1 * 9/2003 Kamanaka et al. ......... 709/224

FOREIGN PATENT DOCUMENTS

JP          088423       3/1999    ............ H04L/12/54
JP          293346       10/2000   ............. G06F/3/12

OTHER PUBLICATIONS

"Fax Server System for Office" by M. Okada, et al, Nov. 16, 1990, English Abstract.
Patent Abstracts of Japan, Pub. No. 10-164124, Date of Publication Jun. 19, 1998, Canon, Inc. Sekiguchi Kenzo, et al, copy of patent in Japanese also included.

* cited by examiner

*Primary Examiner*—Kimberly Williams
*Assistant Examiner*—Thomas J. Lett
(74) *Attorney, Agent, or Firm*—Duke W. Yee; Jerry W. Herndon; Gerald H. Glanzman

(57) ABSTRACT

An electronic mail-facsimile communication system, an electronic mail-facsimile communication method, and a recording medium on which a program code is recorded for performing a method that allow a facsimile transmission image to be previewed is presented herein. It includes a system for faxing electronic mail over a network includes a client connected to the network and a gateway unit for transmitting a facsimile transmission image to a facsimile machine over a telephone line. The gateway unit converts an e-mail sent from the client into a facsimile transmission image, and creates electronic mail containing the facsimile transmission image to return the electronic mail to the client before sending the electronic mail to the facsimile machine.

10 Claims, 16 Drawing Sheets

[Figure 1]
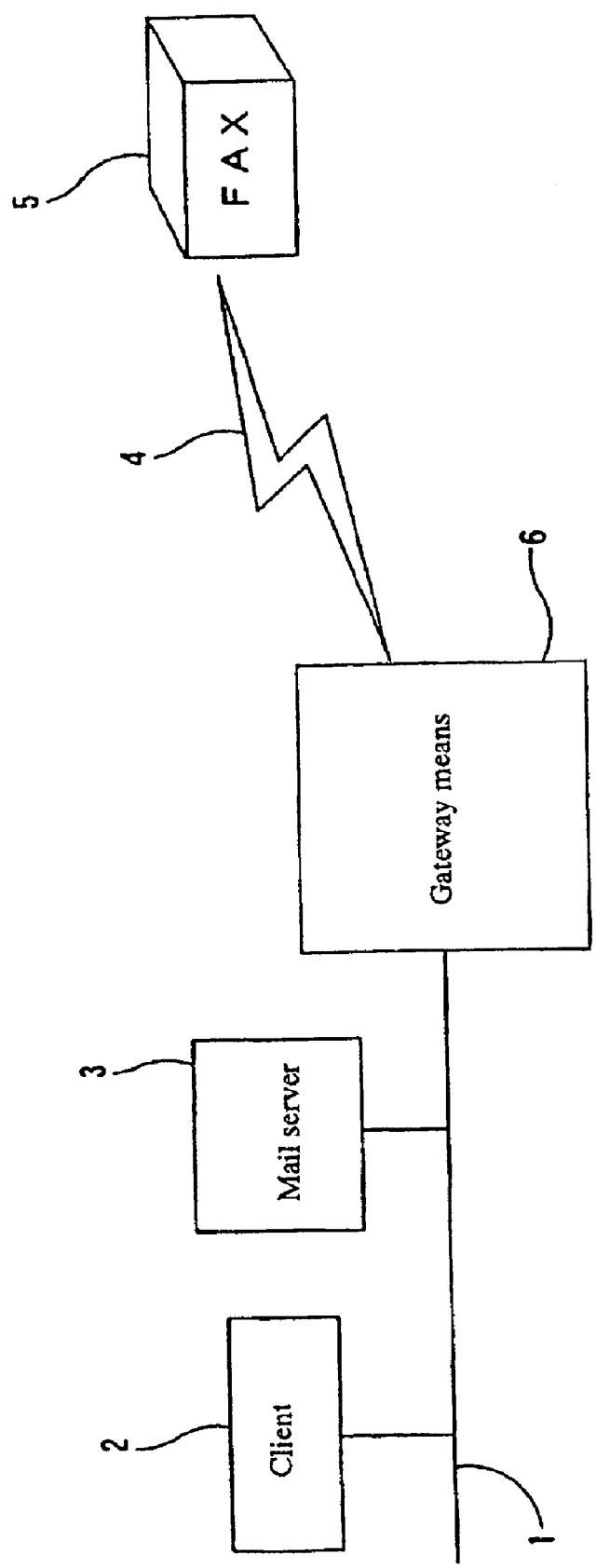

[Figure 2]
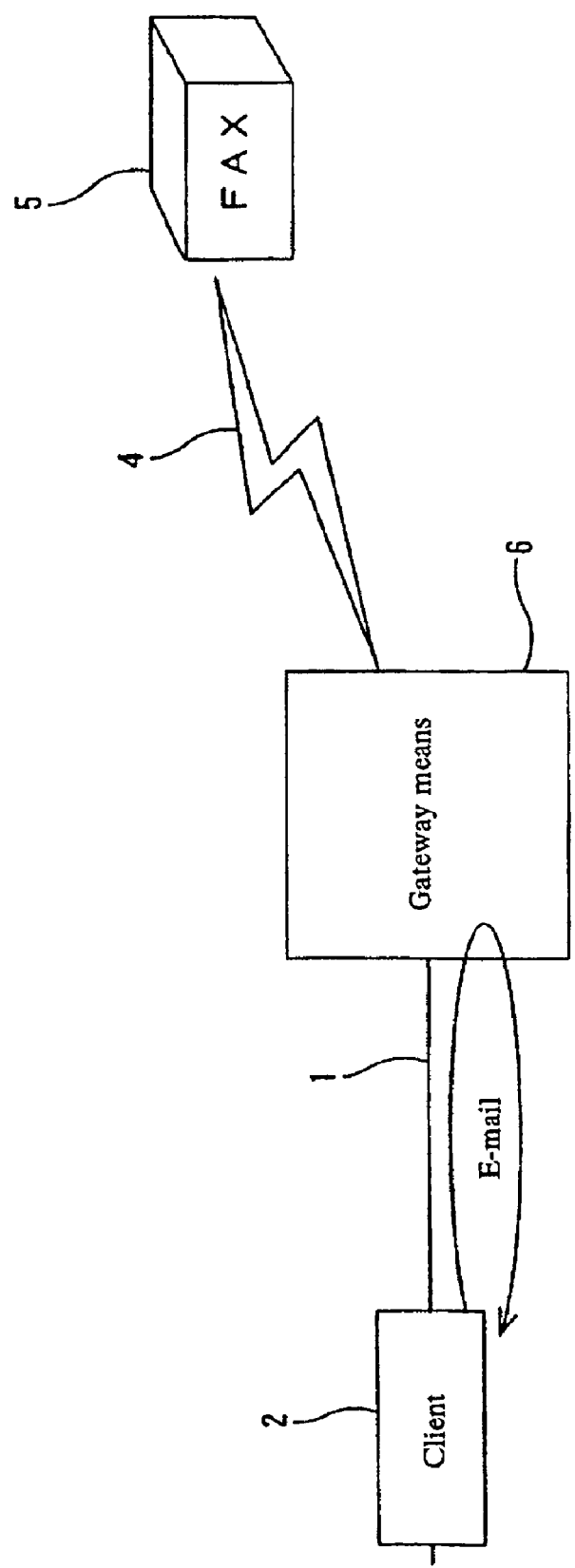

[Figure 3]
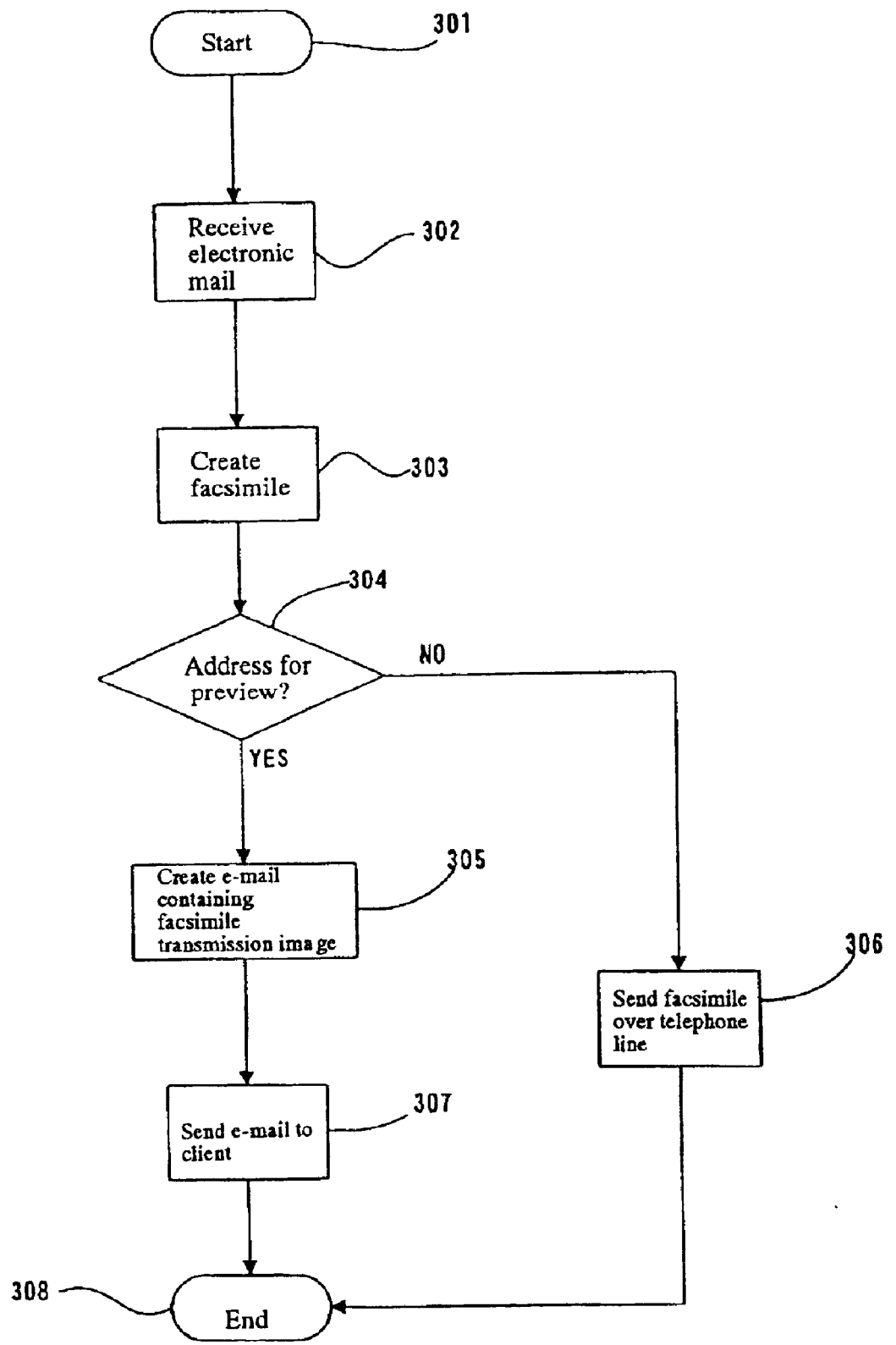

[Figure 4]

Examples of address for preview

[SMTP mail system]

For sending facsimile
- "fax-number%user-ID@host-name"
- "aaa-bbb-cccc%fax@fax-gate-way.dddd.eee.fff"

For preview
- "faxpreview%fax@fax-gate-way.dddd.eee.fff"
- "faxpreview@fax-gate-way.dddd.eee.fff"
- "dummy@fax-preview.dddd.eee.fff"

[Notes system]

For sending facsimile
- "fax-number@domain-name"
- "aaa-bbb-cccc@fax"

For preview
- "preview@fax"
- "dummy@faxpreview"

[Figure 5]
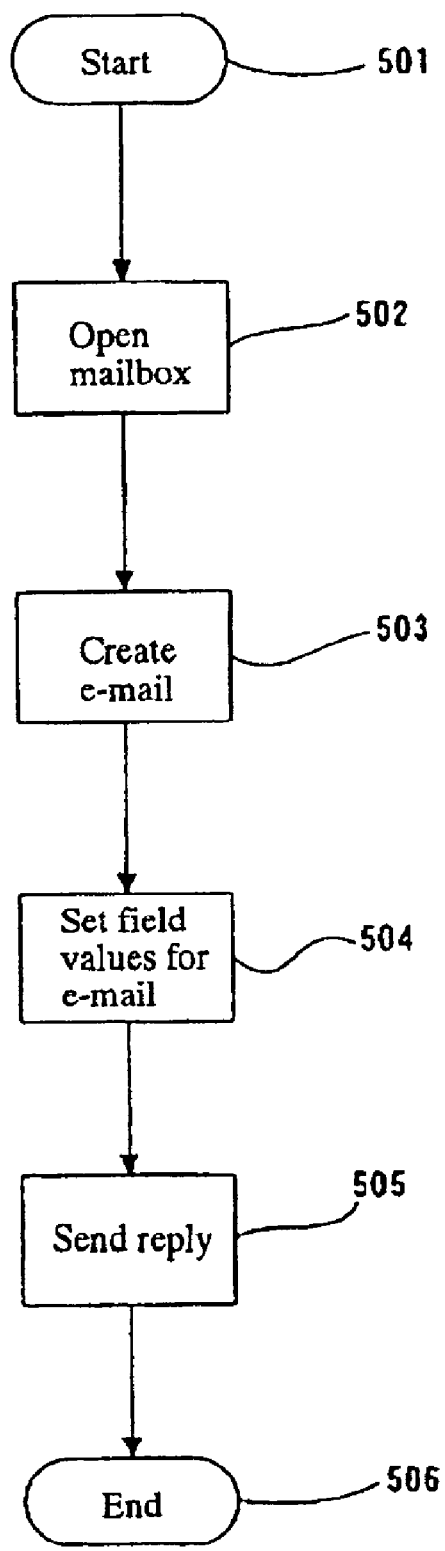

[Figure 6]

[Main routine]

// Definition

| | |
|---|---|
| hBox | :Mailbox |
| hNote | :E-mail |
| ImageFile | :Image data file name |
| MailInfo | :Address information, etc. |

// Process

```
NSFDbOpen(hBox);
NSFNoteCreate(hBox, hNote);
setFields(hNote, MailInfo, ImageFile);
sendMail(hNote);
```

[Figure 7]
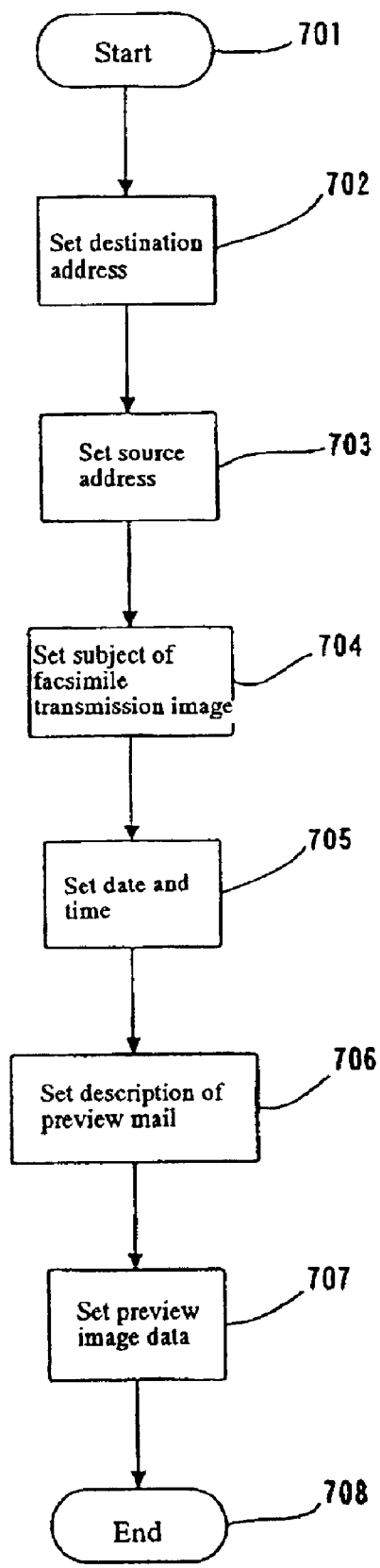

[Figure 8]

[Details of subroutine setFields()]

// Process

```
setSendTo();
setFrom();
setSubject();
setDateTime();
setTopText();
setImage();
```

[Figure 9]

From preview@fax on YYYY/MM/DD TT:TT PM
To: aaaaa BBBB/Japan/ccc@ddd.eee
cc:
From: preview@fax
Subject: Fax transmission preview image (functionality expansion of fax system)

This is a fax transmission preview image for the subject "functionality expansion of fax system."

-------------------------------------------------------------------------------

Fax Information

To: ABC Trading Company
    Mr. Nihon Taro
    FAX:xxx-xxx-xxxx Phone:xxx-xxx-xxxx From: Nihon KKKK Co.
    Sender name
    FAX:xxx-xxx-xxxx Phone:xxx-xxx-xxxx <u>Date and time: DD/MM/YYYY</u>

Dear Sirs,

We very much enjoyed having had a chance to provide our service for you.

We are sending you the results of our study of the functionality expansion that you requested.

We look forward to hearing from you soon.

Sincerely,

[Figure 10]
From preview@fax on 2000/01/19 03:03 PM
To: Toshiaki Kihara/Japan/IBM@IBMJP
cc:
From: preview@fax
Subject: Fax transmission preview image (functionality expansion of fax system)
This is a fax transmission preview image for the subject "functionality expansion of fax system."
preview.tif

[Figure 11]

```
[Details of subroutine setImage()]

// Definition

N       : The number of image pages
i       : Variable
import  : Switch indicating the import of the image
tmpImage : PCX(PC PaintBrush Picture) format image // If image import
if (import) then
begin
    // Import the image into each page
    for i=1 to N do
    begin
        // Convert the Nth page of the image into PCX format
        convertImage(ImageFile, i, tmpImage);

// Create a record for the image
        createImageRecord(tmpImage);

// Append to the body field of the mail
        appendRecord(hNote, tmpImage);
    end
end
```

[Figure 12]

```
[Details of subroutine setImage()]

// Definition

N        : The number of image pages
i        : Variable
attach   : Switch indicating the attachment of the image
tmpImage : PCX(PC PaintBrush Picture) format image // Process // If image attachment
if (attach) then
begin
    // Attach the image file
    NSFNoteAttachFile(hNote, ImageFile);

// Create the icon for the attached file
    createIcon();

// Make the icon a hot spot (a position which can be clicked on by a mouse)
    createHotSpot();
end
```

[Figure 13]
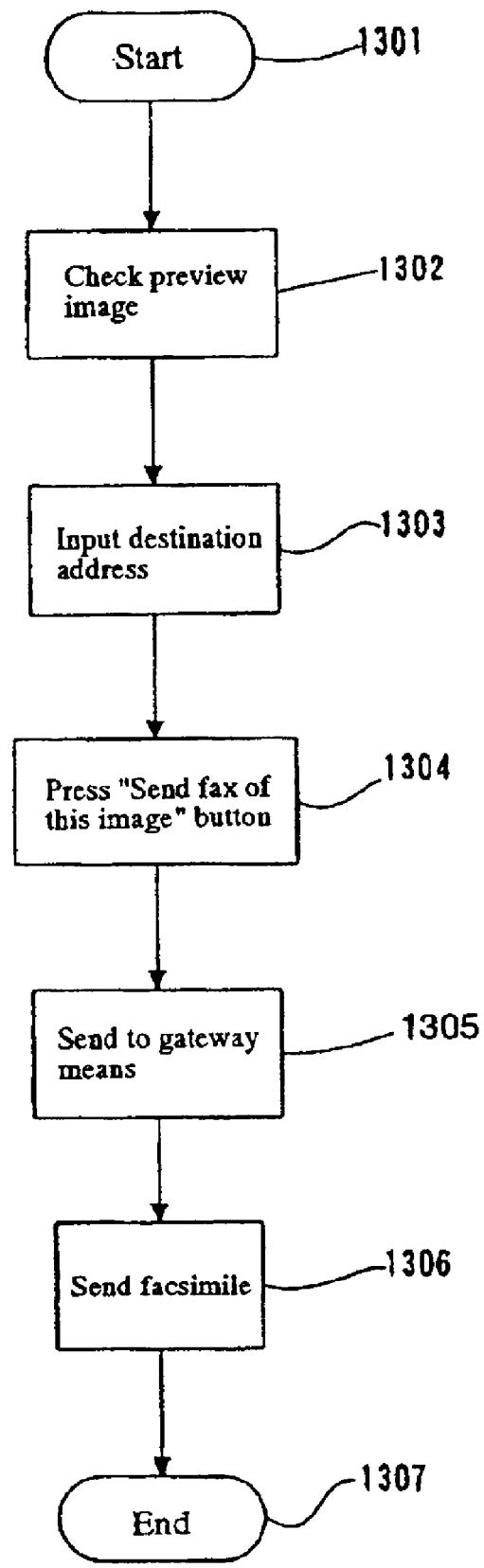

[Figure 14]

Fax Information

To: ABC trading company
    Mr. Nihon Taro
    Fax: xxx-xxx-xxxx    Phone: xxx-xxx-xxxx
From: Nihon KKKK Co.
    Sender name:
    Fax: yyy-yyy-yyyy    Phone: yyy-yyy-yyyy
Time and Data:  DD/MM/YYYY Dear Sirs, We very much enjoyed having had a chance to provide our service for you.

We are sending you the results of our study of the functionality expansion that you requested.

We look forward to hearing from you soon.

Sincerely,

From AAAAA BBBB on YYYY/M
M/DD TT:TT PM
To: xxx-xxx-xxxx@fax
cc:
From: AAAA BBBB/Japan/CCC@DDD.JP
Subject: Functionality expansion of fax system

Fax Information

To:     ABC trading company
       Mr. Nihon Taro
       Fax:   xxx-xxx-xxxx     Phone :xxx-xxx-xxxx From:   Nihon KKKK Co.
       Sender name
       Fax:   yyy-yyy-yyyy     Phone: yyy-yyy-yyyy <u>Date and time:   DD/MM/YYYY</u>

Dear Sirs,

We very much enjoyed having had a chance to
provide our service for you.

We are sending you the
results of our study of the functionality expansion that you
requested.    We look forward to hearing from you soon.    Sincerely,

[Figure 16]

From AAAAA BBBB on YYYY/MM/DD TT:TT PM
To: xxx-xxx-xxxx@fax, EEEE FFFF/Japan/GGG@HHH.jp
cc:
From: AAAA BBBB/Japan/CCC@DDD.JP
Subject: Functionality expansion of fax system

Fax Information

To: ABC trading company
    Mr. Nihon Taro
    Fax: xxx-xxx-xxxx    Phone: xxx-xxx-xxxx From: Nihon KKKK Co.
    Sender name
    Fax: yyy-yyy-yyyy    Phone: yyy-yyy-yyyy Date and time: DD/MM/YYYY Dear Sirs,
We very much enjoyed having had a chance to provide our service for you.
We are sending you the results of our study of the functionality expansion that you requested.
We look forward to hearing from you soon.

Sincerely,

ELECTRONIC MAIL-FACSIMILE COMMUNICATION SYSTEM, METHOD AND RECORDING MEDIUM

BACKGROUND OF THE INVENTION

Allowing a user to send and receive electronic mail (e-mail) to and from a facsimile machine can save the labor of the user and resources to perform facsimile communication. To do this, various methods have been proposed. Various types of systems are used to transmit e-mail through a network. To transmit a facsimile message over a network, gateway means are typically used. For example, when e-mail is sent to a mail server by specifying its address in a format such as "xxx-xxx-xxxx@fax," the mail server determines that the e-mail should be sent as a facsimile message and transfers it to gateway means for transmitting the facsimile messages, instead of a client on another network. The gateway means converts the e-mail into an image that can be faxed, then transmit the facsimile transmission image containing the e-mail information over telephone lines such as an analog or ISDN line to a facsimile machine connected to the telephone or ISDN line.

When e-mail is converted into an image for facsimile transmission in the gateway means, font information and a table in the e-mail are transformed into an appropriate size image such as A4, letter or legal size, then faxed. Although the gateway means is configured to produce the image as faithful to the original mail as possible, it may not always expanded to a facsimile transmission image exactly the same as the original e-mail for subsequent facsimile transmission, depending on the conditions under which the mail is generated.

Conventionally, when e-mail is faxed over a network, means for previewing the image file to be sent is not used. Therefore, the user who performs facsimile transmission over a network often experiences trouble. For examples, a new line or page may begin at an unintended position and the facsimile transmission image sent to the recipient may not have the appearance that the sender has expected. FIG. 15 shows a facsimile image of prior art that was sent with an appearance different from that of originally created in e-mail.

Among prior-art systems for converting e-mail into a facsimile transmission image and faxing it is an apparatus described in Published Unexamined Japanese Patent Application No. 10-164124, field as U.S. patent application Ser. No. 09/xxx,xxx on XXXX xx, 2000, that extracts e-mail from a post office of an e-mail server, converts it into a facsimile transmission image, automatically dials the facsimile number of the recipient of the facsimile transmission, and sends it to the recipient's facsimile machine. Although this apparatus can send e-mail from the mail server to the facsimile machine, it does not allow for previewing the facsimile transmission image converted from the e-mail. It does not allow for previewing or checking the facsimile transmission image actually transmitted, before the transmission.

Also, in the prior art, a facsimile-based e-mail apparatus has been disclosed that expands a image file received as an attached file of e-mail, re-compresses it into a data format that can be received by a facsimile machine, and sends the image file by following a facsimile transmission procedure. The facsimile-based e-mail apparatus allows the image file attached to the e-mail to be sent as an image that can be received by the facsimile machine through the facsimile transmission procedure. However, this facsimile-based e-mail apparatus does not allow the facsimile transmission image converted as described above to be previewed before facsimile transmission.

Also in the prior art, fax-e-mail gateway means has been disclosed that allow a facsimile image to be automatically distributed through e-mail transmission without adding something special such as an electronic distribution form sheet. This fax-e-mail gateway means allows an image data received through facsimile to be transferred as a file attached to e-mail. However, it does not allow the facsimile transmission image converted from the e-mail as described above to be previewed and checked before fax transmission.

Also in the prior art, a communication apparatus has been disclosed which is configured to convert received e-mail into facsimile data and send it to predetermined destinations in a such a way that the e-mail or facsimile message delivered to a user's office can be transferred to the user's apparatus of a different medium at a place away from the office where the user is staying. However, this communication system does not allow the facsimile transmission image to be previewed before the facsimile transmission as described earlier.

On the other hand, a conventional facsimile communication system using a printer driver typically employs a method in which a document is written within an application such as a word processor and faxed through a print menu within the application. For such a system, it has been proposed that a function for previewing the facsimile transmission image be added to an application such as a word processor.

The system that faxes e-mail over a network through gateway means allows a facsimile transmission image to be previewed before facsimile transmission. However, it is not necessarily efficient to install a facsimile driver having a preview function in a number of clients individually.

As described above, the above-mentioned conventional systems for faxing e-mail do not allow for previewing a facsimile transmission image to be sent. The above-mentioned method proposed in order to allow this preview, in which the client user previously create a facsimile transmission image, checks it, then attaches this file to e-mail to send to gateway means, involves installing a new printer driver in a number of clients and therefore is not always efficient.

With the method in which the facsimile transmission image is previously created and checked, then the image file is attached to e-mail to send to a gateway means, it requires that the client user create the facsimile transmission image file each time the user wants to send a facsimile message. As a result, the simplicity and quickness of directly faxing e-mail cannot adequately be achieved.

The conventional method in which a facsimile transmission image is created previously and checked, then this image file is attached to e-mail to send to the gateway means poses a problem when both of the facsimile address and the e-mail address are specified as the destination of the e-mail. That is, the user who received it as e-mail may have a feeling of strangeness because the body of the mail is contained only in the attached file.

On the other hand, for a user who receives mail as a facsimile, the facsimile transmission image sent by the conventional system that sends a facsimile from within an e-mail application would contain both of the destination address for e-mail ("EEEE FFFF/Japan/GGG/@HHH.jp" in FIG. 16) and that for facsimile. Such a facsimile image containing the destination address for e-mail together with that for facsimile may give a feeling of strangeness to the user who received it as a facsimile.

OBJECTS OF THE INVENTION

It is an object of the present invention to provide an electronic mail-facsimile communication system for previewing a facsimile transmission image to make sure that it reproduces an image created as e-mail before faxing the e-mail.

It is another object of the present invention to provide an electronic mail-facsimile communication method for previewing a facsimile transmission image to make sure that it reproduces an image created as e-mail before faxing the e-mail.

It is yet another object of the present invention to provide a machine-readable recording medium containing a program code performing an electronic mail-facsimile communication method for previewing a facsimile transmission image to see that it reproduces an image created as e-mail before faxing the electronic mail.

It is yet another object of the present invention to provide an electronic mail-facsimile communication system, an electronic mail-facsimile communication method, and a machine readable recording medium containing a program code for performing the method, wherein the user of a client sending electronic mail can preview a facsimile transmission image to be sent without the need of adding a new program or application and making any change to the user interface of the electronic mail application.

SUMMARY OF THE INVENTION

The electronic mail-facsimile communication system of the present invention is a system for performing facsimile communication of e-mail over a network, including: e-mail sending and receiving means connected to the network; and gateway means connected to the network for transmitting a facsimile transmission image to a facsimile machine over a communication line such as a telephone line. The gateway means comprises means for determining the destination of the e-mail sent from the e-mail sending and receiving means, generates e-mail containing the facsimile transmission image according to the destination, and returns the e-mail to the e-mail sending and receiving means which sent the e-mail or transmits the facsimile transmission image to a facsimile machine connected to the gateway means over a communication such as a telephone line.

The e-mail-facsimile communication system of the present invention includes a mail server connected to the network and the gateway means may be configured to return the e-mail containing the facsimile transmission image to the e-mail sending and receiving means through the mail server.

In the e-mail-facsimile communication system of the present invention, an image file converted from a facsimile transmission image may be inserted into or attached to e-mail to be returned to the e-mail sending and receiving means.

The e-mail-facsimile communication system of the present invention may be configured to send only the facsimile transmission image to the facsimile machine.

The e-mail-facsimile communication method of the present invention is a method for faxing e-mail over a network, comprising the steps of: sending the e-mail from an e-mail sending and receiving means connected to the network; receiving the e-mail and converting the e-mail into a facsimile transmission image; creating e-mail containing the facsimile transmission image; and determining the destination of the e-mail sent from the e-mail sending and receiving means. If the destination indicates previewing, the e-mail is returned to the e-mail sending and receiving means sending the e-mail. If the destination indicates facsimile communication, the facsimile transmission image is faxed to the destination.

According to the e-mail-facsimile communication method of the present invention, the returning step may be arranged to return the email containing the facsimile transmission image to the e-mail sending and receiving means through a mail server connected to the network.

In the e-mail-facsimile communication method, the faxing step may be arranged to send only the facsimile transmission image.

In the e-mail-facsimile communication method, the image file converted from the facsimile transmission image may be inserted into or attached to the e-mail returned to the e-mail sending and receiving means.

The recording medium of the present invention is a machine-readable recording medium on which a program code for causing a method to be performed for faxing e-mail over a network, the method comprising the steps of: sending the e-mail from an e-mail sending and receiving means over the network; receiving the e-mail and generating a facsimile transmission image; creating e-mail containing the facsimile transmission image; and determining the destination of the e-mail sent form the e-mail sending and receiving means.

If the destination indicates previewing, the e-mail is returned to the e-mail sending and receiving means containing the facsimile transmission image. If the destination indicates facsimile communication, the facsimile transmission image is faxed to the destination.

The above-mentioned method for faxing e-mail may be arranged to return the email containing the facsimile transmission image to the e-mail sending and receiving means through a mail server connected to the network.

The above-mentioned method for faxing e-mail may be arranged to send only the facsimile transmission image.

In the above-mentioned method for faxing e-mail, the image file converted from the facsimile transmission image may be inserted into or attached to the e-mail returned to the e-mail sending and receiving means.

BRIEF DESCRIPTION OF THE DRAWINGS

FIG. 1 shows an embodiment of an e-mail-facsimile communication system according to the present invention;

FIG. 2 shows another embodiment of the e-mail-facsimile communication system according to the present invention;

FIG. 3 is a flowchart showing an e-mail-facsimile communication method according to the present invention;

FIG. 4 shows examples of modified destination addresses entered in the e-mail-facsimile communication method according to the present invention;

FIG. 5 is a flowchart showing an e-mail creation process;

FIG. 6 shows a pseudo-code for the e-mail creation process shown in FIG. 5;

FIG. 7 is a flowchart of the "setFields( )" process of the e-mail creation process shown in FIG. 5;

FIG. 8 shows a pseudo-code for the "setFields( )" process of the e-mail creation process shown in FIG. 7;

FIG. 9 shows a preview image according to the present invention;

FIG. 10 shows an example of a modified preview image according to the present invention;

FIG. 11 shows a pseudo-code used for inserting a facsimile conversion image into a preview image;

FIG. 12 shows a pseudo-code used for attaching a facsimile conversion image to a preview image;

FIG. 13 shows another embodiment of a facsimile transmission procedure according to the present invention;

FIG. 14 shows a facsimile image which is sent according to the present invention;

FIG. 15 shows a facsimile image sent by a prior-art e-mail-facsimile communication system; and FIG. 16 shows a facsimile image sent by a prior-art e-mail-facsimile communication system.

DETAILED DESCRIPTION OF THE PREFERRED EMBODIMENTS

According to the present invention, when a particular user sends e-mail as a facsimile through a gateway means, the e-mail sent by the particular client user is converted into a facsimile transmission image by the gateway means. The gateway means then generates e-mail containing the facsimile transmission image and returns the e-mail to the particular client user who sent the e-mail with the intention of faxing it. An image file converted from the facsimile transmission image is inserted into or attached to the returned e-mail so that the client can preview the facsimile transmission image within an e-mail application. As used herein, the term "image file" refers to an electronic file reconverted from a converted facsimile transmission image so that it can be transmitted as e-mail. The present invention will be described below with respect to exemplary embodiments shown in the attached drawings.

FIG. 1 is a schematic view of an e-mail-facsimile communication system according to the present invention. The system of the present invention includes a plurality of clients 2 interconnected through a network 1; a mail server 3 for processing mail from the clients 2; and gateway means 6 including the capabilities of converting the e-mail into a facsimile transmission image and transmitting it as a facsimile over a telephone line 4 to a facsimile machine 5 connected to the telephone line 4.

The client 2, which has the capability of creating e-mail, is electronic mail sending and receiving means and can send and receive e-mail to and from another client over the network 1. The mail server 3 is also connected to the network 1 and distributes e-mail created by the client 2 over the network 1. The network 1 mentioned above may be a LAN/WAN system using a protocol such as TCP/IP or may be another network using an appropriate protocol other than TCP/IP.

The clients 2 are configured to include computers such as a personal computer and a workstation. The client user uses an e-mail software program stored in the personal computer/workstation to send and receive e-mail to and from another client or the gateway means 6. Any personal computers/workstations that are known heretofore can be used as the client 2, including a personal computer and a workstation that use, for example, Pentium ("Pentium" is a trademark of Intel) or other central processing units compatible with it and can run an operating system such as WINDOWS ("WINDOWS" is a trademark of Microsoft Corporation), OS/2 ("OS/2" is a trademark of International Business Machines Corporation) or AIX ("AIX" is a trademark of International Business Machines Corporation) for example.

The mail server 3 receives e-mail sent from the client 2 and, if it is sent as e-mail, sends it to a specified destination. If the e-mail is sent as a facsimile, the mail server 3 sends the e-mail to the gateway means 6. The mail server 3 having these capabilities may be a personal computer/workstation that includes a mail server software program and a central processing unit such as Pentium (registered trademark of Microsoft Corporation) or other central processing units compatible with it.

Gateway means 6 receives e-mail specified to be faxed from the mail server 3 and converts the e-mail, which may contain image information in addition to text information such as a text file, into a facsimile transmission image. As used herein, the term "facsimile transmission image" refers to only the part of a facsimile message that is created within an e-mail software program for the purpose of facsimile transmission and does not include information about the destination and the sender of the e-mail. The electronic information that can be sent as e-mail described above includes various types of information produced electronically. In particular, it includes text, image information, electronic information written in HTML format, and a message exchanged in a small LAN without the intervention of the mail server 3, as well as application-specific electronic information created by using various applications installed in the client 2.

The gateway means 6 which can be used in the present invention may be configured by using means such as a personal computer/workstation. The gateway means 6 comprises determination means for determining whether the destination of e-mail contains a preview request or contains an address for directly faxing. The determination means may be various types of conventional determination means, in particular, it may be central processing units such as those given above.

The gateway means 6 converts the e-mail into a facsimile transmission image and, if the sender sending the e-mail as a facsimile wants to preview, returns it as e-mail to the client 2. When the facsimile transmission image is returned as e-mail, the gateway means reconvert the facsimile transmission image including this facsimile transmission image into an image file that can be read by the mail server 3 and the client 2 and insert or attach it to the electronic mail.

The e-mail containing the facsimile transmission image thus provided is returned to the mail server 3. The mail server 3 receives the e-mail and returns the e-mail containing the facsimile transmission image to the client user who wants to fax it. The e-mail containing the facsimile transmission image is displayed on the client user's display as a preview image and the client user determines whether the e-mail is exactly reproduced in the converted facsimile transmission image.

Furthermore, the present invention is not limited to the above-described embodiment in which the mail server 3 and the gateway means 6 are separately connected to the client-server system as described above. FIG. 2 shows another exemplary embodiment of the e-mail-facsimile communication system according to the present invention. In the embodiment shown in FIG. 2, a mail server capability is added to gateway means 6 and the gateway means 6 and a client 2 are interconnected through a network. Furthermore, according to the present invention, a system may be used in which a plurality of clients 2 are interconnected by peer-to-peer connection through a hub for example, and a message in the form of electronically generated information message is exchanged between the client 2 and gateway means 6 without the intervention of a mail server.

FIG. 3 is a flowchart showing an e-mail-facsimile communication method performed by gateway means 6 used in an e-mail-facsimile communication system according to the present invention. The e-mail-facsimile communication method of the present invention starts at step 301 and e-mail sent by a client 2 is received by the gateway means 6 through a mail server 3 at step 302. Here, if the e-mail is sent from the client 2 to the gateway means 6, the client user inputs the destination address of the e-mail as "xxx-xxx-xxxx@fax."

On the other hand, if the client user requests previewing of the facsimile transmission image, the client user inputs "preview@fax," for example, in the destination and sends the e-mail. In either case, the e-mail sent by the client user is sent to the gateway means 6 and processed appropriately by determination means included in the gateway means 6.

Then, at step 303, the gateway means 6 receives the e-mail to which the destination address for facsimile transmission is added and converts it into a facsimile transmission image for faxing. The e-mail to which the destination address for facsimile transmission is added may consist of only text data or may have a image file that can be transmitted as e-mail inserted into it. In addition, an image file may be attached to the e-mail having a destination address for facsimile transmission added to it. The conversion method from e-mail into a facsimile transmission image includes a method in which text data in the received e-mail is converted into a format, for example, the ITU standard format for G3 facsimile. In addition, in order to transmit received e-mail as a facsimile, the e-mail can be converted into A4-sized bitmapped data and converted it into MMR data which can be faxed. Any other known conversion methods may also be used.

Then, at step 304, the gateway means 6 determines whether the client user wants to preview the facsimile transmission image. The determination at step 304 is performed by determination means, which is not shown, included in the gateway means 6, reading information from the "To" field containing the destination of the e-mail. The gateway means 6 reads the destination information from the "To" field of the e-mail and, if the destination corresponds to a preview request, for example, "preview@fax" (i.e. if the determination at step 304 is "YES"), then e-mail containing a facsimile transmission image is generated at step 305.

On the other hand, if the destination of the e-mail is specified as "xxx-xxx-xxxx@fax" indicating that the user wants to fax it directly without previewing (i.e. if the determination at step 304 is "NO"), then the gateway means 6 determines that the client user wants to fax it directly and, at step 306, sends the facsimile over a telephone line as usual.

Specific method for differentiating a preview destination from a facsimile destination may be using an address such as "preview@fax" or using a part of a destination facsimile number or user ID, or using a host name or domain name or a part thereof.

FIG. 4 shows an example of a modified destination address which can be specified when requesting previewing. As shown in FIG. 4, in case of a Simple Mail Transfer Protocol (SMTP) mail system, a format such as "fax-number%user-ID@host-name" may be used as a destination. In this case, a destination may be specified in a format such as "aaa-bbb-cccc%fax@fax-gate-way.dddd.eee.fff" when transmitting as a usual facsimile.

To specify a preview destination address, formats such as "faxpreview%fax@fax-gate-way.dddd.eee.fff," "faxpreview@fax-gate-way.dddd.eee.fff," or "dummy@fax-preview.dddd.eee.fff" may be used.

For example, when Notes (trademark, an e-mail system from Lotus(C)) is used, the destination may be specified in a format "fax-number@domain-name." In this case, a destination may be specified in a format "aaa-bbb-cccc@fax" when transmitting as a conventional facsimile. To specify a preview destination address, formats "preview@fax" or "dummy@faxpreview" may be used. These destination formats are just a few example of the destinations that can be specified. Any other formats may also be used.

Returning to FIG. 3, the e-mail-facsimile communication method of the present invention will be described. If the destination in the "To" field is "preview@fax" for example, indicating that the user wants previewing, then e-mail containing the facsimile transmission image is generated at step 305 in FIG. 3. The generation of the e-mail containing the facsimile transmission image may be accomplished by reconverting the converted facsimile transmission image into an image file that the mail server 3 and the client 2 can handle. The image data may be in various data format, including PCX, JPEG, TIFF, and BMP. Conversion from facsimile transmission image into an image file may be accomplished, for example, by compressing the facsimile transmission image into data in a format, such as PCX, JPEG, TIFF, or BMP.

FIG. 5 is a flowchart of a process for creating e-mail from a facsimile transmission image performed at step 305 shown in FIG. 3. The e-mail creation process starts at step 501 in FIG. 5 and proceeds to step 502, where a mailbox is open. Then the process creates e-mail in the opened mailbox at step 503. The process then proceeds to step 504, where the field values such as the destination address, sender, and subject of the e-mail are set in the e-mail created at step 503. The e-mail creation process proceeds to step 505, where the created e-mail is returned to the mail server 3, then the process ends. The mail server 3, which receives this e-mail, is configured to return the e-mail containing the facsimile transmission image to the client 2 requesting the preview to present the preview to the client 2.

FIG. 6 shows a pseudo-code that outlines the above-described e-mail creation process. In the pseudo-code shown in FIG. 6, "NSFDbOpen(hBox)" opens a mailbox, "NSFNoteCreate(hBox, HNote)" creates e-mail, "setFields (hnote, MailInfo, ImageFile)" sets field values for the e-mail, and "sendMail(hNote)" returns the e-mail.

FIG. 7 shows a flowchart of "setFields( )" which sets values in the fields of e-mail among pseudo-code steps shown in FIG. 6. The field value setting process starts at step 701, then the destination address is set at step 702. The destination address is read by the determination means (not shown) of the gateway means 6 from the "From" field in the e-mail sent from the client 2. This process enables the e-mail containing a facsimile transmission image to be returned to the client user who wants to preview the mail.

Then, the field value setting process sets the sender address at step 703. The sender address is read from the "To" field in the e-mail sent from the client 2. In this embodiment of the present invention, if the client user requesting previewing enters the e-mail address "preview@fax," then "preview@fax" would be set in this field.

At step 704, the subject of the facsimile transmission image to be previewed is set. The subject is read from the "subject" field of the e-mail created by the client user requesting the previewing and information indicating that this is the preview image of facsimile transmission is added to the subject. Then the field value setting process proceeds to step 705, where date and time are set. At step 706, text explaining that this is e-mail for previewing is provided to help the client user recognize that the e-mail for previewing is returned. The explanation provided at step 706 may be in any format that allows the client user to know that the mail is displayed for previewing. If appropriate, the step 706 may be omitted.

Then, at step 707, the field value setting process sets as preview image data a facsimile transmission image converted into an image file that can be read by the mail server 3 or the client 2. Then the field value setting process in FIG. 7 ends at step 708. FIG. 8 shows a pseudo-code for implementing the process in the flowchart shown in FIG. 7. In the pseudo-code in FIG. 8, "setSendT( )" sets the destination address, "setFrom( )" sets the sender address, and "setsubject( )" sets the subject. "SetDateTime( )" sets the date and time, "setTopText( )" sets text explaining that the mail is displayed for previewing, and "setImage( )" sets preview image data.

In the present invention, a facsimile transmission image may be returned as a preview image to the client 2 by inserting the image file converted from the facsimile conversion image into the e-mail, or by attaching the facsimile conversion image to the e-mail as an attached file.

FIG. 9 shows an example of a preview image generated by the e-mail-facsimile communication method. The preview image shown in FIG. 9 is created by inserting a facsimile transmission image into e-mail to be returned. Besides the information such as date and time, the name of the client 2 requesting the preview is indicated as "aaaa BBBB" in this preview image. In the preview image, it is indicated that the mail was returned from "Preview@fax," which is the destination address for a preview request in this exemplary embodiment of the invention. In addition, the text, "Fax transmission preview image" and the subject are provided in the "Subject" field in order to indicate that this image is the preview of a facsimile transmission image. In the preview image shown in FIG. 9, an image file converted from the facsimile transmission image is inserted below the above-mentioned items so that whether the facsimile transmission image is converted exactly as it is created as e-mail can be checked.

FIG. 10 shows a preview image provided when a preview image returned to the client 2 is an attached file to e-mail. In the exemplary embodiment shown in FIG. 10, the same items as those shown in FIG. 9 are displayed in the upper part and a facsimile transmission image is attached as a TIFF file to the e-mail to be returned.

FIG. 11 shows a pseudo-code used for inserting an image file converted from a facsimile transmission image at step 707 in the field value setting process shown in FIG. 7. In the pseudo-code shown in FIG. 11, "convertImage(ImageFile, i, tmpImage)" inserts the image into each page and converts the Nth page of the image into, for example, a PCX format image. Then "createImageRecord(tmpImage)" creates a record for the image and "appendRecord(hNote, tmpImage)" inserts the image in to the body field of the mail. During this process, the facsimile conversion image may be scaled up or down so as to appear in an appropriate size on the display of the client 2.

FIG. 12 shows a pseudo-code for attaching a facsimile conversion image to e-mail at step 707 in FIG. 7. In the pseudo-code shown in FIG. 12, "NSFNoteAttachFile (hNote, ImageFile)" attaches the image file to the e-mail, "createIcon( )" creates the icon of the attached file, and "createHotSpot( )" creates a location of an icon that can be clicked on by a mouse.

Returning to FIG. 3, the e-mail-facsimile communication method of the present invention will be described. After e-mail containing a facsimile transmission image is created at step 305, the gateway means 6 returns the e-mail containing the facsimile transmission image created as described above to the client 2 requesting the preview at step 307. The client user who received the e-mail containing the facsimile transmission image can check the facsimile transmission image from the preview image on the display of the client 2.

If the converted image is proper, client user may change the destination address of the e-mail created for faxing to the above-mentioned address "xxx-xxx-xxxx@fax," and fax it as usual faxing. If, on the other hand, the transmission image in the preview image is different from the image sent as e-mail, the e-mail can be modified appropriately until the facsimile transmission image converted from the e-mail is properly displayed on the preview image, thereby allowing a good facsimile image without a defect to be sent.

According to the present invention, when performing the facsimile transmission described above, all the items such as the sender's address, destination address, and data and time shown in FIGS. 9 and 10 and displayed on the upper portion of the facsimile conversion image are deleted and only the facsimile transmission image is sent. By doing so, a high-quality facsimile transmission can be provided that does not contain the e-mail address of the recipient mixed with the facsimile number of the recipient and does not give a feeling of strangeness to the recipient.

FIG. 13 is a flowchart of another exemplary embodiment for performing facsimile transmission at step 306 in FIG. 3 in the e-mail-facsimile communication method of the present invention. The facsimile transmission procedure shown in FIG. 13 is preferably performed by saving an image file created during previewing until the facsimile is actually sent. In addition, it is preferable that, when the preview image file is saved, an image file number is associated with it as its index and saved. Furthermore, a "Fax this image" button and a "Fax to" entry field may be provided in e-mail to be returned to the client user for previewing, before it is returned to the client user at step 306 in FIG. 3. The button and the entry field may be provided at an appropriate stage after the image file for previewing is created at step 305 in FIG. 3.

The transmission procedure shown in FIG. 13 starts at step 1301 and the client user checks the preview image at step 1302. If the preview image has no problem, the client user enters the destination address of the facsimile in the "Fax to" entry field at step 1303. The destination address may be entered in "facsimile number@fax" format, for example. The input format may not be limited to the format given above, instead, any format may be used. For example, a table that lists facsimile numbers written in a predetermined format may be displayed to allow the user to select from the pre-stored facsimile number.

The transmission procedure shown in FIG. 13 then proceeds to step 1304 where the client user, entered a facsimile number, presses the "Fax this image" button. Then the transmission procedure proceeds to step 1305, where the content of the "Fax this image" and the number of the image file to be faxed are sent to the gateway means 6. The order of steps 1303 and 1304 may be changed. A "Modify this image" button may be provided in the preview screen and allow the user to preview the image again after the layout of the image is modified.

At step 1306, the gateway means 6 uses the image file number as an index to search stored image files to find the image file. The found image file is faxed over a telephone line 4 to a facsimile machine remotely connected to "Fax this machine." The facsimile transmission procedure shown in FIG. 13 allows the client user to perform facsimile transmission quickly without re-opening the e-mail to change the destination address and saves labor in facsimile transmission.

FIG. 14 shows an image sent to a remote facsimile machine 5 connected over a telephone line 4 according to the present invention and output from the facsimile machine 5. As shown in FIG. 14, the facsimile transmission method according to the present ensures that a good facsimile image is sent without fault because it converts e-mail into a facsimile transmission image and then allows the user to check the facsimile transmission image in a preview image before the facsimile transmission over the telephone line 4. In addition, it allows a high-quality facsimile image to be sent without presenting an e-mail destination address together with a facsimile number.

In addition to the e-mail-facsimile communication system and the e-mail-facsimile communication method, the present invention includes a machine-readable recording medium containing a program code for causing the above-described e-mail-facsimile communication method of the present invention to be performed. Examples of the recording medium include, magnetic recording media such as a floppy disk, a hard disk, and a magnetic tape, and optical recording media such as CD-ROM, DVD, and a magneto-optical disk, as well as any other recording media known heretofore.

While the present invention has been described with respect to the embodiments shown in the drawings, the present invention is not limited to these embodiments. Any configuration of the e-mail-facsimile communication system and any codes for the processes known heretofore may be used. The process procedures shown in the pseudo-codes described above, may be written in any object-oriented programming languages, including "C," for example. While the e-mail-facsimile communication system of the present invention has been described in detail with respect to examples in which faxing from within an e-mail program, the e-mail-facsimile communication system and e-mail-facsimile communication method of the present invention are not limited to faxing from within the e-mail program. Instead, they allows a facsimile image sent from a facsimile machine to gateway means to be sent as e-mail to a particular client in a network.

As described above, the present invention can provide an e-mail-facsimile communication system that allows for previewing a facsimile conversion image to be sent in an e-mail-facsimile communication system.

In addition, the present invention can provide an e-mail-facsimile communication method that allows for previewing a facsimile conversion image to be sent in an e-mail-facsimile communication system.

Furthermore, the present invention can provide a machine-readable recording medium containing program code for performing an e-mail-facsimile communication method that allows for previewing a facsimile conversion image to be sent in an e-mail-facsimile communication system.

The present invention ensures that an image created with an e-mail application is sent without fault, thereby saving labor and resources during sending facsimile from within the e-mail application.

Furthermore, the present invention can provide an e-mail-facsimile communication system, an e-mail-facsimile communication method, and a machine-readable recording medium containing a program code for performing the e-mail-facsimile communication method, which allow a client user sending e-mail to preview a facsimile conversion image to be sent without adding a new program or application or modifying the user interface of an e-mail application.

Furthermore, the present invention can provide an e-mail-facsimile communication system, an e-mail-facsimile communication method, and a machine-readable recording medium containing a program code for performing the e-mail-facsimile communication method, which allow for providing a high-quality facsimile transmission image sent without providing the e-mail address of its recipient together with the facsimile number of the recipient.

What is claimed is:

1. An electronic mail-facsimile communication system for faxing electronic mail over a network, comprising:
   an electronic mail sending and receiving unit connected to said network; and
   a gateway unit connected to said network for transmitting a facsimile transmission image to a facsimile machine over a line,
   wherein said gateway unit comprises a unit for determining a destination of the electronic mail sent from said electronic mail sending and receiving unit, generates electronic mail containing said facsimile transmission image according to said destination, and returns the electronic mail to said electronic mail sending and receiving unit which sent the electronic mail or transmits said facsimile transmission image to a facsimile machine connected to said gateway unit over said line; and
   wherein said system comprises a mail server connected to said network and said gateway unit returns the electronic mail containing said facsimile transmission image to said electronic mail sending and receiving unit through said mail server.

2. An electronic mail-facsimile communication system for faxing electronic mail over a network, comprising:
   an electronic mail sending and receiving unit connected to said network; and
   a gateway unit connected to said network for transmitting a facsimile transmission image to a facsimile machine over a line,
   wherein said gateway unit comprises a unit for determining a destination of the electronic mail sent from said electronic mail sending and receiving unit, generates electronic mail containing said facsimile transmission image according to said destination, and returns the electronic mail to said electronic mail sending and receiving unit which sent the electronic mail or transmits said facsimile transmission image to a facsimile machine connected to said gateway unit over said line; and
   wherein an image file converted from said facsimile transmission image is inserted into or attached to said electronic mail to be returned to said electronic mail sending and receiving unit.

3. A method for faxing electronic mail over a network, comprising the steps of:
   sending electronic mail from electronic mail sending and receiving unit connected to said network;
   receiving said electronic mail and converting said electronic mail into a facsimile transmission image;
   creating electronic mail containing said facsimile transmission image;

determining the destination of the electronic mail sent from said electronic mail sending and receiving unit; and returning the electronic mail containing said facsimile transmission image to said electronic mail sending and receiving unit sending the electronic mail if said destination indicates previewing; and faxing said facsimile transmission image if said destination indicates facsimile communication.

4. The electronic mail-facsimile communication method according to claim 3, wherein said returning step comprises the step of returning the electronic mail containing said facsimile transmission image to said electronic mail sending and receiving unit through a mail server connected to said network.

5. The electronic mail-facsimile communication method according to claim 3 or 4, wherein said faxing step comprises the step of sending only said facsimile transmission image.

6. The electronic mail-facsimile communication method according to claim 3 or 4, wherein said steps of creating electronic mail containing said facsimile transmission image comprises the step of inserting an image file converted from said facsimile transmission image into the electronic mail returned to said electronic mail sending and receiving unit or attaches it to the electronic mail.

7. A machine-readable recording medium containing a program code for causing a method for faxing electronic mail over a network to be executed, said method comprising the steps of:

sending electronic mail from electronic mail sending and receiving unit over a network;

receiving said electronic mail and generating a facsimile transmission image;

creating electronic mail containing said facsimile transmission image;

determining the destination of the electronic mail sent from said electronic mail sending and receiving unit;

returning the electronic mail containing said facsimile transmission image to said electronic mail sending and receiving unit sending the electronic mail if said destination indicates previewing; and faxing said facsimile transmission image if said destination indicates facsimile communication.

8. The recording medium according to claim 7, wherein said returning step comprises the step of returning the electronic mail containing said facsimile transmission image to said electronic mail sending and receiving unit through a mail server connected to said network.

9. The recording medium according to claim 7 or 8, wherein said faxing step comprises the step of sending only said facsimile transmission image.

10. The recording medium according to claim 7 or 8, wherein said steps of creating electronic mail containing said facsimile transmission image comprises the step of inserting an image file converted from said facsimile transmission image into the electronic mail returned to said electronic mail sending and receiving unit or attaches it to the electronic mail.

* * * * *